United States Patent
Horita et al.

(10) Patent No.: US 7,941,029 B2
(45) Date of Patent: May 10, 2011

(54) MOVING-IMAGE SHOOTING DEVICE, METHOD OF SHOOTING MOVING-IMAGE, RECORDING MEDIUM IN WHICH VIDEO SIGNALS ARE RECORDED BY THE SAME SHOOTING DEVICE, MOVING-IMAGE REPRODUCING DEVICE FOR REPRODUCING THE VIDEO SIGNALS RECORDED IN THE SAME MEDIUM, AND METHOD OF REPRODUCING THE MOVING-IMAGE

(75) Inventors: Seiji Horita, Osaka (JP); Hideaki Mita, Hyogo (JP); Hiroaki Shimazaki, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 983 days.

(21) Appl. No.: 11/569,400

(22) PCT Filed: Oct. 19, 2005

(86) PCT No.: PCT/JP2005/019635
§ 371 (c)(1),
(2), (4) Date: Nov. 20, 2006

(87) PCT Pub. No.: WO2006/067909
PCT Pub. Date: Jun. 29, 2006

(65) Prior Publication Data
US 2007/0242139 A1      Oct. 18, 2007

(30) Foreign Application Priority Data

Dec. 24, 2004   (JP) .................................. 2004-372804

(51) Int. Cl.
*H04N 5/935*   (2006.01)

(52) U.S. Cl. ........................................ 386/210; 386/233
(58) Field of Classification Search ................... 386/46, 386/95, 117, 130, 131
See application file for complete search history.

(56) References Cited

U.S. PATENT DOCUMENTS

| 2003/0011689 A1* | 1/2003 | Shioji ........................ 348/231.6 |
| 2004/0017481 A1* | 1/2004 | Takasumi et al. ......... 348/207.99 |
| 2004/0081437 A1* | 4/2004 | Asada et al. .................. 386/131 |

FOREIGN PATENT DOCUMENTS

| JP | 08-223530 | 8/1996 |
| JP | 2002-94939 A | 3/2002 |
| JP | 2002-152569 | 5/2002 |
| JP | 2003-198909 A | 7/2003 |
| JP | 2004-15377 A | 1/2004 |
| JP | 2004-180290 A | 1/2004 |
| JP | 2004-259138 A | 9/2004 |
| WO | WO 02/39737 A1 | 5/2002 |

OTHER PUBLICATIONS

International Search Report for corresponding PCT International Application No. PCT-JP2005/019635 dated Mar. 6, 2006.

* cited by examiner

*Primary Examiner* — Huy T Nguyen
(74) *Attorney, Agent, or Firm* — RatnerPrestia

(57) ABSTRACT

A shooting device includes a frame-rate setting section, a shooting section, and a recording section. The frame-rate setting section sets a frame rate at the shooting and a frame rate at the reproducing arbitrarily and independently. The shooting section shoots moving images at the shooting frame rate, and the recording section records video signals of the shot moving images together with information about the shooting frame rate and information about the reproducing frame rate, where both of the information are linked with the video signals.

10 Claims, 6 Drawing Sheets

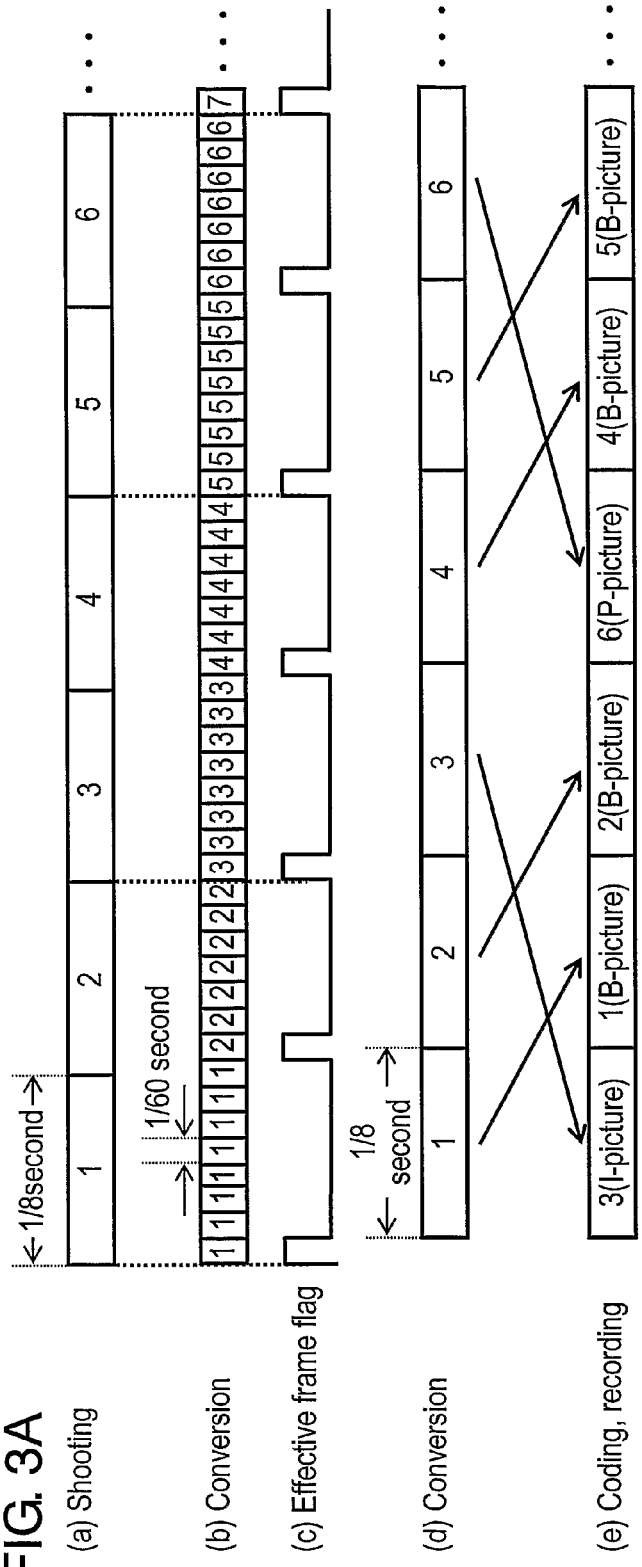
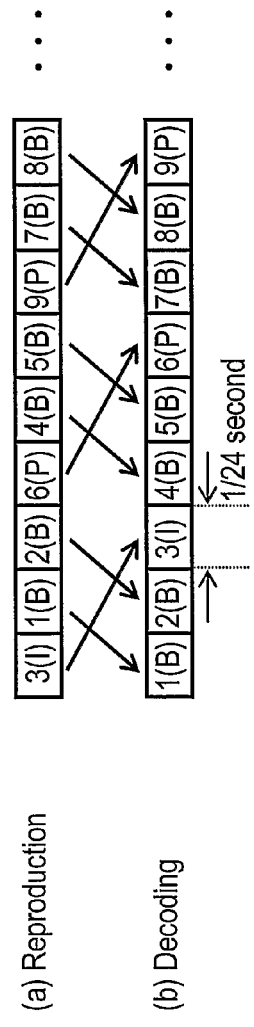
FIG. 3A
(a) Shooting
(b) Conversion
(c) Effective frame flag
(d) Conversion
(e) Coding, recording
FIG. 3B
(a) Reproduction
(b) Decoding

FIG. 5A

```
<xsd:complexType name="VFRRatioType">
  <xsd:simpleContent>
    <xsd:extension base="VFRRatioBaseType">
      <xsd:attribute name="VFRState" type="VFRStateType" use="optional"/>
    </xsd:extension>
  </xsd:simpleContent>
</xsd:complexType>
<xsd:simpleType name="VFRRatioBaseType">
  <xsd:restriction base="xsd:string"/>
<xsd:simpleType>
<xsd:simpleType name="VFRStateType">
  <xsd:restriction base="xsd:NMTOKEN">
    <xsd:enumeration value"constant"/>
    <xsd:enumeration value="variable"/>
  </xsd:restriction>
</xsd:simpleType>
```

FIG. 5B

```
...
<Video>
  ...
  <VFRRatio VFRState="24/8"/>
  ...
</Video>
...
```

MOVING-IMAGE SHOOTING DEVICE, METHOD OF SHOOTING MOVING-IMAGE, RECORDING MEDIUM IN WHICH VIDEO SIGNALS ARE RECORDED BY THE SAME SHOOTING DEVICE, MOVING-IMAGE REPRODUCING DEVICE FOR REPRODUCING THE VIDEO SIGNALS RECORDED IN THE SAME MEDIUM, AND METHOD OF REPRODUCING THE MOVING-IMAGE

This application is a U.S. National Phase Application of PCT International Application No. PCT/JP2005/019635 Filed Oct. 19, 2005.

TECHNICAL FIELD

The present invention relates to moving-image shooting devices, methods of shooting moving images, recording media in which video signals are recorded by the same moving-image shooting devices, moving-image reproducing devices for reproducing the video signals recorded in the media, and methods of reproducing the moving images.

BACKGROUND ART

The movies have been conventionally shot and recorded in radiographic film as moving images (hereinafter referred to simply as "video") at a frame rate of 24 frames/second. There are various techniques producing visual effects such as slow-motion, quick-motion in the movies. Those techniques reproduce videos that have been shot with the time base extended or shortened. The slow motion or quick motion is carried out in this way: moving images are shot at a frame rate of greater or smaller than 24 frames/second, then reproduced at a frame rate of 24 frames/second.

Assume that videos shot at 48 frames/second are reproduced at 24 frames/second, it means that videos shot in one second is reproduced in two seconds, so that slow motion with the time base doubled can be reproduced. Assume that videos shot at 12 frames/second are reproduced at 24 frames/second, it means that videos shot in two seconds are reproduced in one second, so that quick motion with the time base halved can be reproduced.

The movies can be shot, recorded, and reproduced in another way, i.e. an electronic technique has been introduced to them and it is now widely used. The electronic technique, in general, employs pickup elements such as CCD (charged coupled device) for converting videos into electrical signals, which are then recorded in magnetic recording media before they are reproduced by a reproducing device. In the case of using the film, if a shoot results in failure, the film cannot be used anymore as long as videos are recorded therein. However, in the case of using the electronic technique for shooting and recording, unnecessary video signals in recording media can be overwritten by new video signals for recording, so that the media can be reused. The shooting cost can be thus kept down.

A technique about a device which carries out the quick motion and slow motion through the electronic technique discussed above is disclosed in, e.g. Japanese Patent Unexamined Publication No. 2002-152569. A user of this device can set a frame rate before shooting. The video signals shot at this given frame rate are converted into the rate of 60 frames/second and then recorded. At the reproduction, the frames only obtained by the shooting are extracted and converted into the rate of 24 frames/second again. The slow motion or quick motion is thus reproduced.

Recently a request has arisen that an amount of recording a movie shot be minimized through the electronic technique discussed above. Because the cost involved in the shooting should be reduced, or the video signals shot are preferably stored in a recording medium having rather smaller memory capacity such as a semiconductor memory.

The conventional method discussed above converts video signals shot at lower than 60 frames/second into 60 frames/second for recording, so that the number of frames recorded could be greater than the frames actually shot. As a result, a greater capacity is required.

A moving-image compressing method (hereinafter referred to simply as "video coding"), which compresses inter-frames, is available for reducing an amount to be recorded. MPEG is an example of the video coding. The video coding that compresses inter-frames needs an equal number of frames per unit-time both in recording and reproducing, so that the video coding technique is hard to be employed in the system where different frame rates are used in reproducing slow motion and quick motion respectively.

The conventional technique discussed previously records the video signals of 60 frames/second, so that a frame rate at the shooting is restricted to not greater than 60 frames/second.

DISCLOSURE OF THE INVENTION

The present invention embodies reproducing slow motion and quick motion by setting arbitrarily a frame rate for shooting and another frame rate for reproducing. It also displays at how many times of speed videos are reproduced. On top of this advantage, the present invention can code video signals shot for storing without increasing or decreasing the number of frames from that at the shoot, so that an amount of the video signals shot can be reduced for recording. The present invention provides moving-image shooting devices, moving-image reproducing devices, methods of shooting videos, and methods of reproducing videos for implementing the advantages discussed above.

The moving-image shooting device of the present invention records video signals obtained by shooting moving images (videos) in a recording medium, and comprises a frame rate setting section, a shooting section, and a recording section. A user sets arbitrarily a frame rate in shooting videos (hereinafter referred to as a shooting frame rate) and a frame rate in reproducing the videos (a reproducing frame rate) in the frame rate setting section, and the shooting section shoots videos at the shooting frame rate. The recording section records the information about the shooting frame rate and the information about the reproducing frame rate together with the video signals shot into a recording medium. Those two kinds of information are linked with the video signals.

The foregoing structure allows shooting videos at the shooting frame rate, and recording the information for reproducing the shot videos at the reproducing frame rate as well as the information necessary for calculating at how many times of speed the reproduction is carried out. Those two kinds of information are linked with the video signals.

If the shooting frame rate differs from the reproducing frame rate, the recording section records both of the information about both of the frame rates linked with the video signals in the recording medium. If both of the rates are equal to each other, it is not necessarily for the recording section to record both of the information about both of the frame rates. This structure allows recording the video signals to be identified with ease whether the video signals are to be reproduced at the reproducing frame rate or at the shooting frame rate.

The moving-image shooting device further comprises a video coding section which provides video signals with a coding process, to be mores specific, inter-frame compression, which is one of methods for compressing moving images. This structure allows coding the video signals by the inter-frame compression, so that an amount of signals to be recorded in a recording medium can be reduced.

The coding process at the video coding section reduces an amount of coded video signals/unit-time (e.g. per second), so that an amount of signals to be recorded at the shooting frame rate or the reproducing frame rate can be reduced.

An amount of coded video signals/unit-time produced by the coding process at the video coding section can be determined by a ratio of the shooting frame rate vs. the reproducing frame rate. This structure allows setting an amount of coded video signals/second, which is produced by coding the video signals shot, based on the ratio of the shooting frame rate vs. the reproducing frame rate. This mechanism allows videos compressed by the inter-frame compression can be reproduced at a frame rate different from the shooting frame rate, so that slow motion and quick motion can be reproduced properly.

There is another structure in which the frame rate setting section divides the shooting frame rate by the reproducing frame rate, and the video coding section codes the video signals at an amount/unit-time based on the division calculation. This structure allows increasing a coding amount/unit-time of video signals obtained by shooting moving images when the shooting frame rate is greater than the reproducing frame rate, and decreasing the coding amount/unit-time of the video signals when the shooting frame rate is smaller than the reproducing frame rate. Thus although the video signals obtained from shooting moving images are compressed by the inter-frame compression, the videos read from the medium can be reproduced at a frame rate different from the shooting frame rate by decoding the coded video signals at a given amount/unit-time. As a result, slow motion and quick motion can be reproduced properly.

The video coding section can have another mechanism than the foregoing one: An amount of coded video signals produced per unit-time is set based on a multiplication of the following two values: one is an amount of coded video signals produced per unit-time by the coding process when the shooting frame rate is equal to the reproducing frame rate, and the other one is a result of the division calculated at the frame rate setting section.

The foregoing mechanism allows producing coded video signals with reference to the amount of coded video signals produced per unit-time when the shooting frame rate is equal to the reproducing frame rate. When video signals obtained by shooting moving images are compressed by the inter-frame compression, the video signals undergo this mechanism, as a result they can be reproduced into slow motion videos or quick motion videos with higher accuracy.

The recording section can record coded video signals, information about a shooting frame rate, and information about a reproducing frame rate in a recording medium under the same file name except extensions which identify kinds of the files. This structure allows recording the video signals, both of the information about the shooting frame rate and the reproducing frame rate under the same file name, so that both of the information can be detected and read with ease when the coded video signals are read from the medium.

The reproducing frame rate can be fixed at 24 frames/second by the frame rate setting section. When videos are shot for reproducing them at 24 frames/second such as movies, this structure allows shooting videos for slow motion reproduction and quick motion reproduction by setting only a shooting frame rate.

The recording section has another structure than the foregoing one: Only when the shooting frame rate is equal to the reproducing frame rate, the recording section can record audio signals. Since this structure allows recording audio signals only when the audio signals are reproduced at the same frequency band as the one when they were recorded, this structure can prevent the audio signals from being reproduced in a poor condition caused by a frequency band changed due to slow motion or quick motion reproduction.

The recording media of the present invention contain something recorded by the moving-image shooting device, namely, the media in which video signals shot by the moving-image shooting device at the shooting frame rate, information about the shooting frame rate, and information about the reproducing frame rate, both the information linked with the video signals, are recorded. As a result, the video signals shot can be linked with both of the foregoing information.

The recording media of the present invention contain something recorded by the moving-image shooting device. When the shooting frame rate is different from the reproducing frame rate, coded video signals shot at the shooting frame rate and having undergone the coding process, i.e. compression of moving images, to be more specific, inter-frame compression, are recorded in the media, being linked with the information about the shooting frame rate and the information about the reproducing frame rate. As a result, the coded video signals having undergone the coding process, i.e. the compression of moving images, can be linked with the information about the shooting frame rate and the information about the reproducing frame rate.

The recording media of the present invention can record the information (SF) about the shooting frame rate and the information (RF) about the reproducing frame rate as a ratio of SF vs. RF, so that the moving-image reproducing device can record those information as a simple form, i.e. the ratio of SF vs. RF, to be handled with ease.

The moving-image reproducing devices of the present invention read video signals from the media, in which the moving-image shooting device has recorded the video signals, and then reproduce the moving images. Each one of the moving-image reproducing devices comprises a data reading section, a reproducing section, and a reproduction times-speed calculating section.

The data reading section reads at least video signals, and the information about the shooting frame rate and the information about the reproducing frame rate, both the information linked with the video signals and recorded in the medium, from the recording medium. The reproducing section reproduces the video signals read from the medium into moving images based on the information about the reproducing frame rate. Based on the foregoing two kinds of information, the reproduction times-speed calculating section calculates at how many times of speed the video signals are reproduced.

The foregoing structure allows reproducing the video signals recorded in the medium at the reproducing frame rate linked with the video signals, and calculating at how many times of speed the video signals are reproduced.

Another moving-image reproducing device of the present invention reads coded video signals recorded in the recording medium, and decodes the signals before they are reproduced into moving images. This reproducing device comprises a data reading section, a reproducing section, and a reproduction times-speed calculating section. The data reading section reads at least coded video signals from the medium, then the reproducing section decodes the coded video signals. The reproduction times-speed calculating section calculates at how many times of speed the video signals are reproduced in the reproducing section.

The data reading section reads the information about the shooting frame rate and the information about the reproducing frame rate when a recording medium stores both of those information. When a recording medium stores both of those information, the reproducing section provides the coded video signals read from the medium with a decoding process based on the information about the reproducing frame rate before the video signals are reproduced into moving images.

When a recording medium stores both of the forgoing information, the times-speed calculating section calculates how many times of speed is used for the reproduction based on both of the information read from the medium. If a recording medium stores neither of the information, the times-speed calculating section uses a single-time the speed for the reproduction.

The foregoing structure allows the moving-image reproducing device to reproduce coded video signals read from the recording medium at the reproducing frame rate if the information about the reproducing frame rate has been recorded in the medium. If the information is not recorded in the medium, the moving-image reproducing device can reproduce the coded video signals at the same frame rate as the shooting frame rate at which the coded video signals have been shot. In this case, time-base information at the shooting or time-base information about a decoding process should be referred to.

If information (SF) about a shooting frame rate of coded video signals and information (RF) about a reproducing frame rate of the coded video signals are recorded in a recording medium, at how many times of speed the reproduction is carried out can be calculated with a ratio of SF vs. RF. If neither of the information is recorded, a single-time the reproduction speed is used.

A decoded amount/unit-time of coded video signals read out from a recording medium in the reproduction section can be equal to a coded amount/unit-time of video signals provided the shooting frame rate is equal to the reproducing frame rate, where both of the rates have been set at the video coding section. This structure allows the reproducing section to carry out a series of jobs smoothly such as reading the coded video signals from a recording medium and then decoding the signals.

A method of shooting moving images of the present invention comprises the following four steps:
  (a) setting arbitrarily a shooting frame rate, i.e. the number of frames/unit-time in shooting moving images as well as a reproducing frame rate, i.e. the number of frames/unit-time in reproducing the moving images;
  (b) shooting moving images at the shooting frame rate and recording video signals of the moving images shot in a recording medium;
  (c) determining whether or not the shooting frame rate differs from the reproducing frame rate; and
  (d) recording information which indicates the shooting frame rate as well as information which indicates the reproducing frame rate in the recording medium, where both of the information are linked with the video signals of the moving images shot, only when the shooting frame rate differs from the reproducing frame rate.

The foregoing method allows the video signals to be determined with ease whether the video signals shot at the shooting frame rate are to be reproduced at the reproducing frame rate or at the shooting frame rate, before the video signals are recorded in a recording medium. The method also allows recording the information necessary for calculating how many times of speed is used for the reproduction into the recording medium with the video signals linked with.

The forgoing method further comprises the following five steps:
  (e) producing coded video signals by providing the video signals with a coding process, i.e. moving image compression through an inter-frame compression method;
  (f) recording the coded video signal instead of the video signals into the recording medium;
  (g) dividing the shooting frame rate by the reproducing frame rate;
  (h) multiplying the result of the division by an amount of coded video signals produced per unit-time, when the shooting frame rate is equal to the reproducing frame rate in step (e); and
  (i) setting a value obtained in step (h) as an amount of coded video signals to be produced per unit-time in step (e).

The foregoing method allows producing coded video signals with reference to the amount of coded video signals produced per unit-time by the coding process, when the shooting frame rate is equal to the reproducing frame rate. Thus the method can produce coded video signals supposed to be used for reproducing slow motion or quick motion with higher accuracy.

A method of reproducing moving images of the present invention reads the coded video signals from a recording medium for reproducing the moving images. The method comprises the following seven steps:
  (a) reading coded video signals from a recording medium;
  (b) detecting whether or not information about a shooting frame rate and information about a reproducing frame rate of the coded video signals are recorded in the medium;
  (c) reading the shooting frame rate and the reproducing frame rate from the medium if both of the information stated in step (b) have been recorded;
  (d) reproducing the coded video signals read from the medium at the reproducing frame rate read from the medium;
  (e) reproducing the coded video signals read from the medium at the same frame rate as the shooting frame rate which was used in shooting the coded video signals, when neither of the information stated in step (b) is detected;
  (f) calculating how many times of speed is used for the reproduction by finding a ratio of the information about the shooting frame rate vs. the information about the reproducing frame rate, when both of the information stated in step (b) are detected; and
  (g) using a single-time of speed for the reproduction when neither of the information stated in step (b) is detected.

The foregoing method allows reproducing coded video signals read from a recording medium based on the recorded information about a reproducing frame rate of the coded video signals. If such information is not recorded in the medium, the method allows reproducing the coded video signals at the same frame rate as the shooting frame rate used in shooting moving images of the coded video signals. In this case, information about a time-base at the shooting or information about a time-base related to a decoding process set at the shooting should be referred to, and those information is linked with the coded video signals and recorded in the medium.

When both of the information stated in step (b) are recorded in a recording medium, the foregoing method can calculate how many times of speed is used for the reproduction by using a ratio of the shooting frame rate information vs. the reproducing frame rate information. When neither of the information stated in step (b) is recorded in the medium, a single time the speed is used for the reproduction.

BRIEF DESCRIPTION OF THE DRAWINGS

FIG. 3A shows a schematic diagram illustrating video signals supplied from the moving-image shooting device in accordance with the embodiment of the present invention.

FIG. 3B shows a schematic diagram illustrating video signals supplied from the moving-image reproducing device in accordance with the embodiment of the present invention.

FIG. 5A shows an example of xml file description of the moving-image shooting device in accordance with the embodiment of the present invention.

FIG. 5B shows an example of xml file description of the moving-image shooting device in accordance with the embodiment of the present invention.

DETAILED DESCRIPTION OF THE PREFERRED EMBODIMENT

An exemplary embodiment of the present invention is demonstrated hereinafter with reference to the accompanying drawings.

Figure 1:
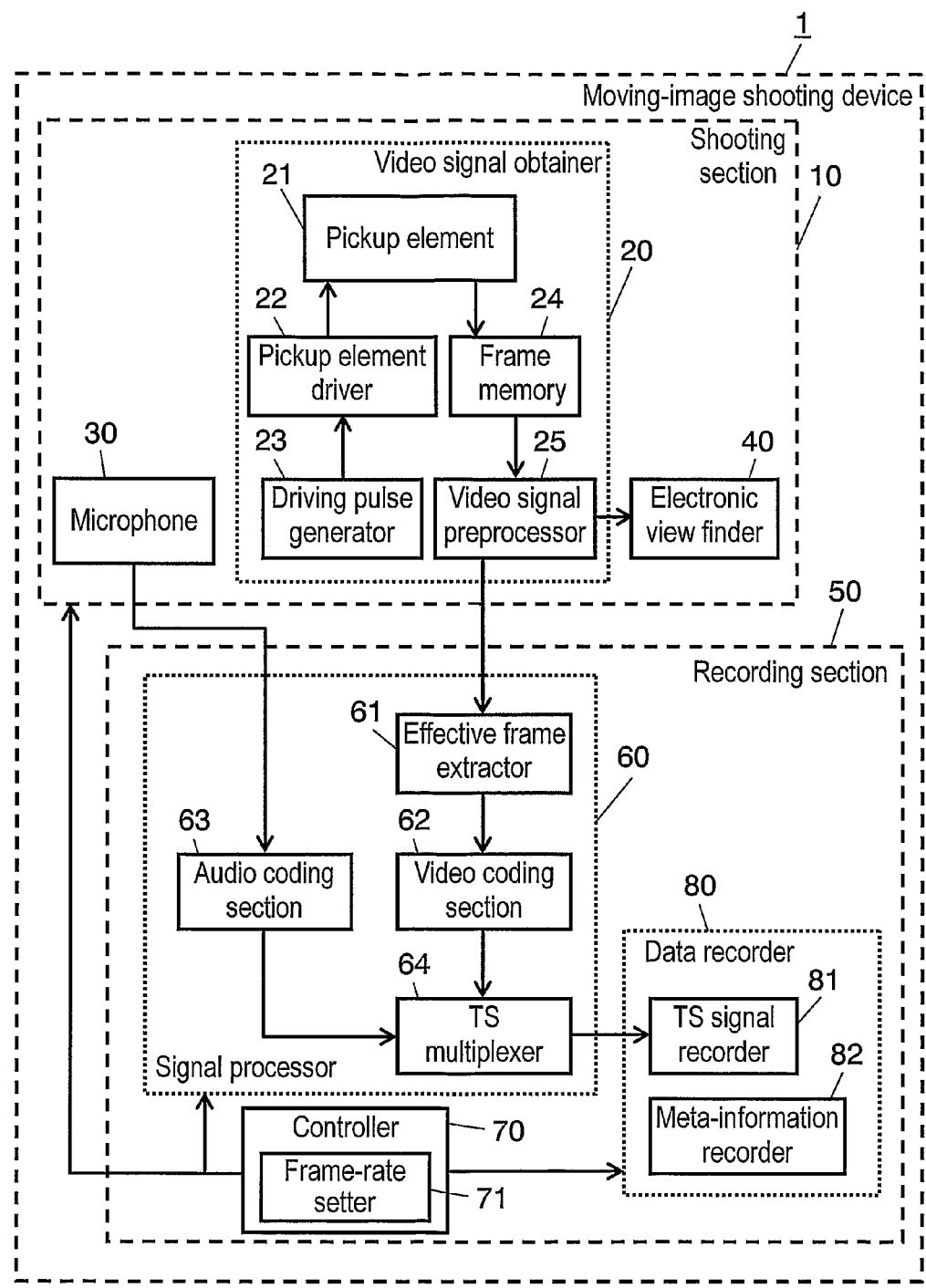
FIG. 1 shows a block diagram illustrating a moving-image shooting device in accordance with an exemplary embodiment of the present invention.

FIG. 1 shows a block diagram illustrating a moving-image shooting device in accordance with the exemplary embodiment of the present invention. A user of moving-image shooting device 1 (hereinafter referred to simply as "shooting device 1") can set the number of frames/second (hereinafter referred to simply as "frame rate") at the shooting and at the reproducing independently and arbitrarily in shooting device 1. In other words, moving images are shot and the resultant video signals are recorded in a recording medium at the shooting frame rate set by the user, and the video signals are reproduced at the reproducing frame rate set by the user.

A shooting frame rate greater than a reproducing frame rate will reproduce slow motion, and a shooting frame rate smaller than a reproducing frame rate will reproduce quick motion. In this embodiment, a shooting frame rate is set at X (X=any real number) and a reproducing frame rate is set at 24.

Shooting device 1 is formed of shooting section 10 and recording section 50. Video signals and audio signals obtained by shooting section 10 are compressed in recording section 50, and recorded in a recording medium. Shooting section 10 comprises the following elements:

video-signal obtainer 20 for obtaining video signals by changing videos to electric signals;

microphone 30 for obtaining audio signals by changing audio to electric signals; and electronic viewfinder (EVF) 40 for monitoring video signals during the shooting.

Video signal obtainer 20 includes pickup element 21, pickup element driver 22, driving pulse generator 23, frame memory 24, and video-signal preprocessor 25. Pickup element 21 is formed of known element such as CCD. Pickup element driver 22 drives pickup element 21, and driving pulse generator 23 generates pulses which drives pickup element 21. Frame memory 24 stores video signals obtained by pickup element 21. Preprocessor 25 provides the video signals obtained by pickup element 21 with a preprocessing.

Pickup element 21 converts the light obtained from the outside into electric signals through photoelectric effect, and outputs the electric signals as progressive scanning video signals, which are hereinafter represented by "p" (initial letter of progressive scanning). For instance, a progressive scanning video signal at 24 frames/second is expressed "24p". Pickup element 21 can output video signals at any frame rate.

Driving pulse generator 23 generates pulses, which take out video signals having the shooting frame rate set by the user from pickup element 21, and pickup element driver 22 drives pickup element 21 based on the driving pulses for taking out the video signals from element 21. The video signals taken out from element 21 are stored temporarily in frame memory 24. Assume that the shooting frame rate is X, pickup element 21 outputs video signals of X frames/second, i.e. video signals of Xp.

Video-signal preprocessor 25 reads video signals stored in frame memory 24 repeatedly if necessary, thereby converting the signals into 60p video signals, and provides the 60p signals with necessary processes, such as gain adjustment, for displaying the signals as videos. Because video display devices, such as a monitor display and a viewfinder, are generally designed to display 60p video signals. Those video display devices generally available in the market cannot display extraordinary video signals such as 12p or 24p.

In this embodiment, Xp video signals supplied from pickup element 21 are temporarily converted into 60p video signals, so that the video signals obtained at the shooting can be monitored by using a monitoring device or a viewfinder generally available in the market. In this embodiment, video signals converted into 60p version are displayed on EVF 40, so that the user can monitor the videos displayed on EVF 40 for checking the video signals being now shot.

When video signals converted into 60p version are supplied to recording section 50, preprocessor 25 outputs a signal that identifies a leading frame (hereinafter referred to as an effective frame) of the consecutive and the same video signals read repeatedly from frame memory 24. The identifying signal is synchronized with the video signals and supplied as an effective frame-flag. Therefore, the frames containing the same video signals are repeated between the frame identified by the effective frame flag and the frame just before the frame to be identified by the next effective frame flag.

Recording section 50 includes signal processor 60, controller 70, and data recorder 80. Signal processor 60 codes and multiplexes video signals and audio signals supplied from shooting section 10. Controller 70 controls respective blocks. Data recorder 80 records the coded signals and information about the shooting, recording, and reproducing (hereinafter referred to simply as meta-information) into a recording medium. Recording section 50 adds meta-information to the video signals and audio signals obtained by shooting section 10 and records those signals into the recording medium.

Controller 70 includes frame-rate setter 71 which accepts the shooting frame rate and the reproducing frame rate, both set by the user. Controller 70 controls respective blocks based on the shooting and reproducing frame rates set in frame-rate setter 71. For instance, a shooting frame rate is set at X, then controller 70 controls shooting section 10 such that shooting section 10 shoots a video signal having X frames/second, i.e. Xp video signals are shot. Assume that a reproducing frame rate is set at Y (Y=any real number), then controller 70 controls signal processor 60 and data recorder 80 such that Xp video signals are coded and recorded to be reproduced as video signals having Y frames/second, i.e. Yp video signals.

Signal processor 60 includes effective-frame extractor 61, video-coding section 62, audio-coding section 63, and TS multiplexer 64. Effective-frame extractor 61 extracts effective frames out of video signals sent from shooting section 10. Video-coding section 62 codes the video signals extracted by extractor 61 for compressing. Audio-coding section 63 codes audio signals sent from shooting section 10 for compressing. TS multiplexer 64 multiplexes the video signals and the audio signals, both coded for compressing.

Effective-frame extractor 61 extracts only effective frames out of 60p video signals based on the effective frame flag sent from video-signal preprocessor 25, then converts the effective frames into the shooting frame, i.e. Xp video signals. Video coding section 62 codes the Xp video signals through an MPEG method for compressing. At this time, the Xp video signals shot by shooting section 10 are coded by coding section 62; however, a bit rate, namely, an amount of coded video signals produced per unit-time by this coding process, is set based on not the shooting frame rate but the reproducing frame rate.

In moving-image reproducing device 100 detailed later, a bit rate in decoding the coded video signals in the case of the shooting frame rate equal to the reproducing frame rate is used as a reference bit rate, and assume that R bits/second is the reference bit rate. Then in the case of the shooting frame rate=X, reproducing frame rate=24, i.e. when video signals shot at Xp is reproduced at 24p, video-coding section 62 codes the Xp video signals to video signals having a bit rate of R×(X/24) bits.

Thus the bit rate in coding Xp video signals becomes greater than the reference bit rate in the case of shooting moving images for reproducing slow motion, i.e. in this case, the shooting frame rate is greater than the reproducing frame rate. On the contrary, the bit rate in coding Xp video signals becomes smaller than the reference bit rate in the case of shooting moving images for reproducing quick motion, i.e. in this case, the shooting frame rate is smaller than the reproducing frame rate.

Audio coding section 63 codes audio signals sent from shooting section 10 by using an MEPG audio method for compression, in this embodiment, the audio signals are coded only when a normal reproduction is carried out, namely, when the shooting frame rate is set equal to the reproducing frame rate, the audio signals are coded. In other words, in the case of slow motion reproduction or quick motion reproduction, the audio signals are not coded. This structure prevents the audio signals from being reproduced in a poor condition because a frequency band is changed due to reproducing the slow motion or quick motion.

TS multiplexer 64 multiplexes coded video signals, coded audio signals and information to be necessary for the decoding process based on a transport stream (hereinafter referred to as MPEG-TS) which is one of methods of MPEG. TS multiplexer 64 also adds a header signal for identifying the multiplexed signals, thereby producing transport stream signals (TS signals) before multiplexer 64 outputs the TS signals.

The information to be necessary for the decoding process includes, e.g. program clock reference (PCR) which specifies the timing of the decoding process or the timing of outputting decoded signals, presentation time stamp (PTS) which specifies the timing of outputting respective frames after the decoding process, decoding time stamp (DTS) which specifies the timing about the decoding process. Arrival time stamp (ATS), which specifies the timing of transmitting a packet to a block where the decoding process is carried out, can be added synchronizing with the timing of outputting coded signals from video coding section 62. Meanwhile the packet discussed above is a group of given signals that form the TS signal. Those kinds of information is produced in STC generator (not shown) that produces a system time clock (STC) which is a reference of timings used in coding and multiplexing.

Data recorder 80 comprises TS signal recorder 81 and meta-information recorder 82. Data recorder 80 records meta-information including TS signals produced in TS multiplexer 64, the information about the shooting frame rate and the information about the reproducing frame rate, into a recording medium. The recording medium is a generally known medium such as a magnetic, optical or semiconductor recording medium.

Figure 2:
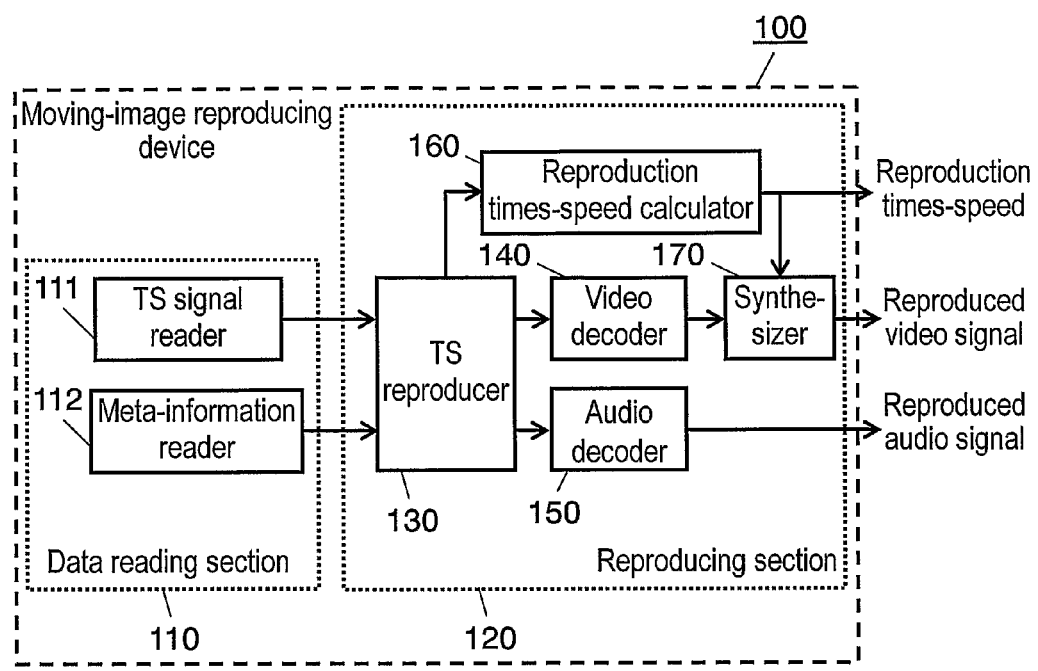
FIG. 2 shows a block diagram illustrating a moving-image reproducing device in accordance with the embodiment of the present invention.

Next, moving-image reproducing device 100 (hereinafter referred to simply as "reproducing device 100") in accordance with an exemplary embodiment of the present invention is demonstrated hereinafter with reference to FIG. 2, which shows a block diagram of reproducing device 100. Reproducing device 100 comprises data reading section 110 and reproducing section 120. Data reading section 110 reads signals from a recording medium, and reproducing section 120 decodes the signals read from the medium, and outputs reproduced video signals and audio signals at the frame rate set by a user of shooting device 1.

Data reading section 110 includes TS signal reader 111 and meta-information reader 112. Reader 111 reads TS signals from the recording medium in which TS signals and meta-information have been recorded. Meta-information reader 112 reads the meta-information including the information about the shooting frame rate and the information about the reproducing frame rate.

At this time, TS signal reader 111 reads the TS signals at R bits/second, where the TS signals have been recorded at R×(X/24) bits/second in recording section 50. Assume that X is 8, where X represents a shooting frame rate, then data reading section 110 reads data at the bit rate three times as much the rate at the recording.

Reproducing section 120 comprises the following elements:

TS reproducer 130;
video decoder 140;
audio decoder 150;
reproduction times-speed calculating section 160; and
synthesizer 170.

TS reproducer 130 reproduces TS signals. Video decoder 140 decodes coded signals. Audio decoder 150 decodes audio signals. Reproduction times-speed calculating section 160 calculates at how many times of speed the video signals are reproduced. Synthesizer 170 synthesizes the information about the reproduction speed calculated with the video signals being reproduced.

TS reproducer 130 reproduces TS signals from the TS signals and the meta-information read by data reading section 110, and separates coded video signals from coded audio signals before outputting those signals respectively. Video decoder 140 decodes the coded video signals supplied from TS reproducer 130, and outputs them as reproduced video signals. At this time, video decoder 140 outputs the reproduced video signals at the reproducing frame rate set by the user of the shooting device based on the reproducing frame rate information included in the meta-information read by data reading section 110. For instance, if the reproducing frame rate is set at 24, TS reproducer 130 outputs the reproduced video signals having 24 frames/second, i.e. 24p video signals.

Audio decoder 150 decodes the coded audio signals supplied from TS reproducer 130 and outputs the decoded signals as reproduced audio signals. At this time, as discussed previously, if the shooting frame rate is not equal to the reproducing frame rate, the audio is not reproduced in order to prevent the audio from being reproduced in a poor condition caused by reproducing slow-motion or quick-motion.

Reproduction times-speed calculating section 160 calculates, based on the shooting frame rate information and the reproducing frame rate information read by data reading section 110, at how many times of speed the video signals are reproduced. Synthesizer 170 synthesizes the calculated information with the video signals reproduced by video decoder 140 before outputting the synthesized signals. TS reproducer 130 and video decoder 140 are further detailed later.

Next, the video signals obtained by shooting section 10 of shooting device 1 are traced from the step of being recorded as TS signals, the step of being reproduced, to the step of being decoded as 24p video signals with reference to FIGS. 3A and 3B. FIG. 3A shows a schematic diagram illustrating video signals supplied from shooting device 1 in accordance with the embodiment of the present invention. FIG. 3B shows a schematic diagram illustrating video signals supplied from reproducing device 100 in accordance with the embodiment of the present invention. The shooting frame rate of 8 frames/second and the reproducing frame rate of 24 frames/second are used in the following description. Each one of the numbers shown in FIGS. 3A and 3B represents a frame number.

FIG. 3A timing chart "(a) shooting" shows video signals supplied from pickup element 21. Since 8 frames/second is the shooting frame rate, pickup element 21 outputs frame No. 1 and onward per second, i.e. video signals are supplied at every ⅛ second, then those video signals are temporarily stored in frame memory 24.

FIG. 3A timing chart "(b) conversion" shows video signals converted into 60 frames/second by video-signal preprocessor 25, which repeatedly reads the video signals stored in memory 24 at every 1/60 second for converting the signals into 60p video signals. When 8p video signals are converted into 60p video signals, two frames of 8p video signals correspond to 15 frames of 60p video signals.

As shown in FIG. 3A, preprocessor 25 reads the video of frame No. 1 repeatedly 8 times, then reads the video of frame No. 2 repeatedly 7 times, thereby converting 8p video signals into 60p video signals. The video signals of 60p thus obtained are displayed on EVF 40, and the user monitors EVF 40 for checking the video signals being shot.

Timing chart shown in FIG. 3A (c), i.e. effective frame flag, shows effective frame flags synchronized with 60p video signals and supplied from preprocessor 25. As the time chart (b) shows, in the video signals converted to 60p version, a frame of the same video signal is repeated in given times based on the shooting frame rate. In this embodiment, none of those video signals is recorded by recording section 50, but only one frame out of the frames repeatedly read is recorded as an effective frame.

Recording section 50 thus uses 60p video signals and effective frame flags synchronized with the video signals supplied form preprocessor 25 for identifying a leading frame of consecutive and the same frames of the video signals as an effective frame.

A timing chart shown in FIG. 3A (d), i.e. 8p conversion, illustrates video signals converted to the shooting frame rate from the effective frame which has been identified out of 60p video signals by the effective frame flag. Effective frame extractor 61 thus extracts an effective frame identified by the effective frame flag, and converts the frame into the shooting frame rate, i.e. 8p video signals in this case.

FIG. 3A (e) "coding, recording" illustrates the signals coded by video coding section 62, which codes 8p video signals through a method of MPEG for compression. At this time, respective frames are coded to one of I picture, P picture or B picture specified by MPEG. An order of the frames is changed according to the method of MPEG. A bit rate set in coding is set based on the reproducing frame rate.

In this embodiment, the video signals shot at 8p are to be reproduced at 24p, then assume that a reference bit rate is R bits/second, so that video coding section 62 codes video signals to have a bit rate of R×(8/24) bits/second, namely, one third (⅓) of the reference bit rate. The video signals thus compressed become TS signals in TS multiplexer 64, and recorded in a recording medium by data recorder 80.

FIG. 3B (a) "reproduction" illustrates coded video signals separated from the TS signals read from the recording medium. In this embodiment, as described previously, the bit-rate in coding is set based on the reproducing frame rate. For instance, in the case of a set state where video signals shot at 8p are to be reproduced at 24p, the TS signals having a bit rate of one-third of the reference bit-rate are recorded in the recording medium.

When data reading section 110 reads TS signals from the medium, it reads them at the reference bit-rate regardless of the recording bit-rate. Thus the TS signals recorded at one third of the reference bit-rate are read at the reference bit-rate, so that the TS signals have a bit rate three times as much the recording bit-rate.

FIG. 3B (b) "decoding" shows reproduced video signals decoded from coded video signals, which have been read by data reading section 110, by video decoder 140. The coded video signals separated from the TS signals read by data reading section 110 are decoded by decoder 140 according to an MPEG method, and reproduced as 24p video signals. At this time, if TS signals have been read at three-times the bit rate, video signals recorded at 8p are reproduced as 24p video signals, so that videos shot in three seconds are reproduced in one second, namely, it is a quick-motion reproduction at three-times the speed. Slow-motion or quick-motion reproduction is thus achieved in this embodiment.

Next, an exemplary embodiment of the present invention demonstrates the following case: When the shooting frame rate differs from the reproducing frame rate, how the video signals coded by an MPEG method can be decoded at the reproducing frame rate. Decoding of video signals usually uses PCR, which is multiplexed to TS signals, for generating STC in a decoding block, the STC is a sync. signal to be a reference of an operation timing in decoding. In a decoding device, packet transmission, decoding process, and output of reproduced video signals are carried out at the timings specified by information such as ATS, PTS, and DTS which are multiplexed to the TS signals produced at the coding process in shooting. Those kinds of information are used for controlling the timings of the respective processes in decoding.

For instance, in the case of controlling a transmission timing of a packet by using ATS multiplexed to the TS signals, the packet of TS signal read from the medium is transmitted to a decoding block at the time when a reference time specified by STC generated in the decoding block agrees with a time specified by ATS. As discussed above, the decoding process is carried out based on the information, which controls timings, such as ATS, PTS and DTS produced at the coding process, so that video signals can be reproduced in almost the same condition as they were shot.

However, shooting device 1 and reproducing device 100 in accordance with this exemplary embodiment allow reproducing slow-motion or quick motion by shooting, recording, and reproducing video signals at a shooting frame rate and a reproducing frame rate set differently from each other. Thus when different frame rates are used in shooting and in reproducing respectively, the coding process and the decoding process are carried out at different timings, so that the decoding process cannot be carried out based on the information including ATS, PTS, DTS. The STC produced from PCR cannot be used as it is in the decoding process.

Assume that a recording frame rate=X and a reproducing frame rate=Y, then TS signal reader 111 reads TS signals from a recording medium at a bit rate Y/X times the bit-rate supplied from video coding section 62 in shooting. Video decoder 140 decodes the coded video signals of TS signals read from the medium at a bit rate Y/X times the bit rate used in video coding section 62.

Thus when X is different from Y, namely, a recording frame rate is different from a reproducing frame rate, even if a packet of TS signals is transmitted to video decoder 140 at a timing specified by ATS multiplexed to the TS signals, the videos cannot be reproduced at the reproducing frame rate.

In the case of X being smaller than Y, namely, a recording frame rate is smaller than a reproducing frame rate, video decoder 140 is obliged to decode coded video signals at a bit rate greater than that used in video coding section 62. However, the timing specified by ATS which is multiplexed to the TS signals is specified by a slow bit rate used at the coding process in video coding section 62, so that if reproducing device 100 operates based on this timing specified by ATS, a timing of transmitting the packet of the TS signals is delayed. Videos thus cannot be reproduced properly, and reproduced videos are sometimes interrupted. Not only ATS but also PTS or DTS invites this problem.

In the case of a shooting frame rate being set at a different value from a reproducing frame rate, shooting device 1 in accordance with this exemplary embodiment, therefore, provides information which indicates that the video signals recorded are to be reproduced at a frame rate different from their shooting frame rate. The information is then recorded in a recording medium by meta-information recorder 82. As such, recording video signals to be reproduced at a frame rate different from the shooting frame rate is hereinafter referred to as VFR (variable frame rate) recording.

Figure 4:
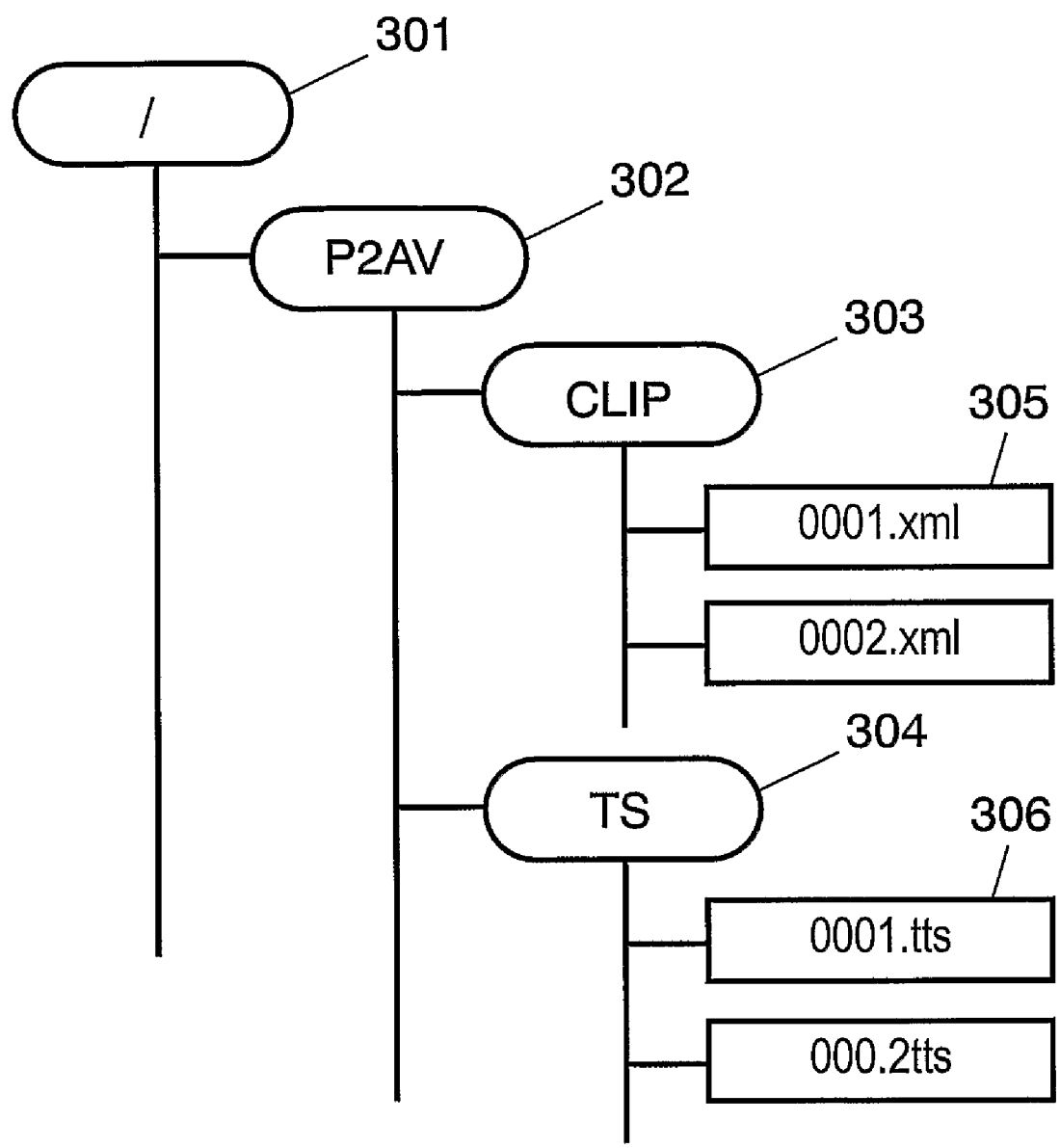
FIG. 4 shows a file structure used when coded video signals supplied from the moving-image shooting device and meta-information are recorded in a recording medium in accordance with the embodiment of the present invention.

Shooting device 1 in accordance with an exemplary embodiment of the present invention records meta-information of video signals VFR-recorded into a recording medium with the following file structure: FIG. 4 shows a file structure which is used for recording coded video signals and meta-information obtained by shooting device 1 into a recording medium. As shown in FIG. 4, in the recording medium, route directory 301 is formed, and P2AV directory 302 which stores the coded video signals and the meta-information is formed just below route directory 301.

Just below P2AV directory 302, CLIP directory 303 which stores the meta-information, and TS directory 304 which stores the coded video signals, are formed. The meta-information is written in XML (extensible Markup Language) format which is one of computer languages, and the file name has extension ".xml" (hereinafter referred to as xml file), and recorded in a hierarchy just below CLIP directory 303.

TS signals have a file name with an extension ".tts" (hereinafter the file name is referred to as "tts file"), and are recorded in a hierarchy just below TS directory 304. In this case, a "tts" file saving TS signals and an "xml" file saving meta-information about the TS signals share the same file name except their extensions, so that the two files show that they pair up with each other. In other words, file of "0001.xml" saves the meta-information about the TS signals saved in file of "0001.tts".

The xml file saves meta-information defined by a schema which describes a possible structure taken by the XML format. If the TS signals saved in the "tts file" pairing up with the "xml file" are the video signals shot at the shooting frame rate different from the reproducing frame rate, the "xml file" saves "VFRRatio" element which defines the information about the shooting frame rate of the TS signals saved in the "tts file" and the information about the reproducing frame rate.

In other words, this exemplary embodiment provides the "FRRatio" element for defining a frame rate at reproducing TS signals, and the meta-information saved in the "xml file" includes the shooting frame rate as well as the reproducing frame rate described with the "VFRRatio" element. Reproducing device 100 thus reads this "VFFRratio" element at the reproduction, thereby identifying what frame rate has been used in shooting, and what frame rate is set for the reproduction.

Next, the description of the "xml file" is detailed hereinafter. FIGS. 5A, 5B show descriptions of an "xml file" of shooting device 1 in accordance with this exemplary embodiment. FIG. 5A shows a schema defining "VFFRatio" element. The shooting frame rate and the reproducing frame rate are described with "VFRState" defined in the element. FIG. 5B shows that the reproducing frame rate is defined by assigning specific numerals to "VFRState".

Here is an example: assume that a shooting frame rate is 8 frames/second, and a reproducing frame rate is 24 frames/second, then in the "video" element headed by <Video> and ended by </Video>, describe <VFRRatio VFRstate="24/8"/>. This description indicates that the shooting frame is 8 frames/second and the reproducing frame rate is 24 frames/second.

In this exemplary embodiment, when the shooting frame rate is equal to the reproducing frame rate, the "VFRRate" element is not described in the "xml file", in this case, TS signals are reproduced at the same frame rate as the shooting frame rate.

Figure 6:
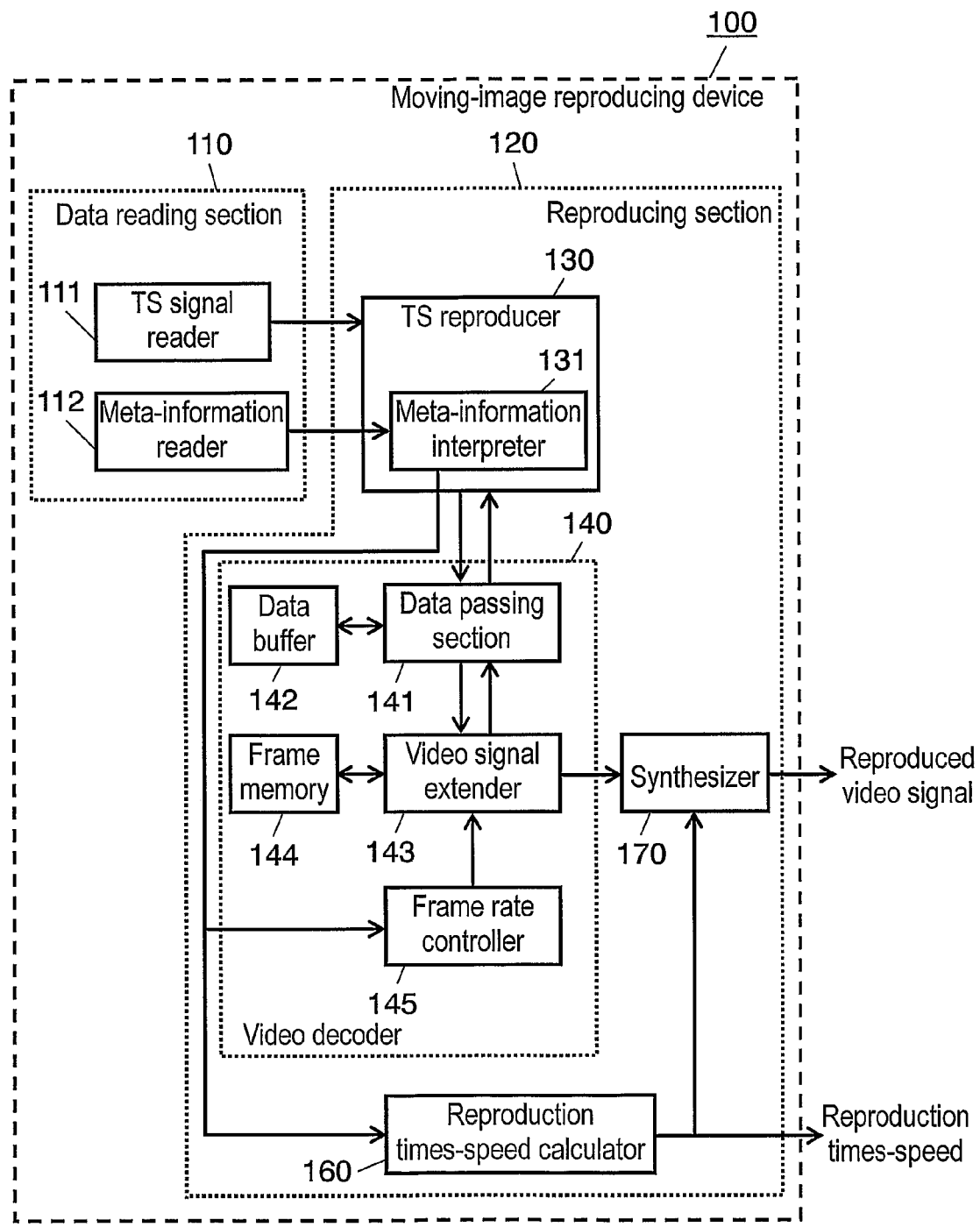
FIG. 6 shows a block diagram illustrating another moving-image reproducing device in accordance with an exemplary embodiment of the present invention.

Reproducing device 100 is again described hereinafter. FIG. 6 shows a block diagram of reproducing device 100 in accordance with this exemplary embodiment, and this diagram omits audio decoder 150 shown in FIG. 2 because only a video decoding process is demonstrated hereinafter.

In FIG. 6, reproducing device 100 comprises data reading section 110 and reproducing section 120 as previously discussed. Data reading section 110 includes TS signal reader 111 and meta-information reader 112. Reproducing section 120 includes TS reproducer 130, video decoder 140, an audio decoder (not shown), reproduction times-speed calculating section 160 and synthesizer 170.

TS reproducer 130 includes meta-information interpreter 131, and reproducer 130 transmits coded video signals to video decoder 140 based on the meta-information ready by data reading section 110. TS reproducer 130 also controls video decoder 140 based on the meta-information, so that decoder 140 outputs reproduced video signals at the reproducing frame rate.

At this time, meta-information interpreter 131 refers to the "xml file" under the same file name as the "tts file" read by data reading section 110, thereby operating as discussed above based on the meta-information described in the "xml file". Interpreter 131 also detects whether or not the meta-information includes the description of "VFRRatio" element.

If the meta-information does not include the description of "VFFRatio" element, interpreter 131 instructs video decoder 140 to carry out a decoding process based on information such as ATS, PTS, DTS multiplexed to TS signals. Meanwhile, each one of those kinds of information specifies an operation timing at the decoding.

If the meta-information includes the description of "VFFRatio" element, interpreter 131 detects numerals assigned to "VFRState" out of the meta-information. In such a case, this embodiment as shown in FIG. 5 describes the reproducing frame rate set apart from the shooting frame by a slash "/" such as <VFFRatio VFRState="24/8"/>. The numeral before the slash "/" is read as the reproducing frame rate and the numeral after the slash "/" is read as the shooting frame rate. The reproducing frame rate read is transmitted to frame-rate controller 145 which is detailed later, and the reproducing frame rate and the shooting frame rate read are transmitted to reproduction times-speed calculating section 160.

Video decoder 140 comprises the following elements:
data passing section 141;
data buffer 142;
video-signal extender 143;
frame memory 144; and
frame-rate controller 145.

Data passing section 141 requests that TS reproducer 130 should transfer coded video signals thereto, and receives the coded video signals from TS reproducer 130 following the request, and transmits the coded video signals to video-signal extender 143. At this time, passing section 141 temporarily stores the coded video signals in data buffer 142 in order to adjust a transmission timing.

Video signal extender 143 decodes the coded video signals transmitted from data passing section 141 according to an MEPG method, thereby extending the compressed video signals to original video signals. At this time, extender 143 temporarily stores the decoded video signals in frame memory 144 in order to restore the order of the frames, then reproduces the video signals having a given frame rate before outputting the video signals.

If the meta-information does not include "VFFRatio" element, video decoder 140 carries out a decoding process based on information such as ATS, PTS, DTS multiplexed to TS signals. Each one of those kinds of information specifies an operation timing at the decoding. If the meta-information includes the description of "VFFRatio" element, data decoder 140 reads reproducing frame rate from the numerals assigned to "VFRState", then carries out the decoding process based on the frame rate, and reproduces the video signals at the reproducing frame rate.

In other words, video decoder 140 produces STC, i.e. a synch signal to be a reference for an operation timing in decoding, by using PCR multiplexed to TS signals, when the meta-information does not include "VFFRatio" element, and also meta-information interpreter 131 instructs decoder 140 based on ATS, PTS, and DTS multiplexed to the TS signals to carry out a decoding process. Then decoder 140 compares the reference time set based on STC with the time specified by ATS, PTS and DTS for carrying out a packet transmission, a decoding process, and an output of reproduced video signals at designated timings respectively. For instance, data passing section 141 supplies a packet of TS signals to video-signal extender 143 at a timing specified by ATS.

Video-signal extender 143 decodes the coded video signals at a timing specified by DTS, and then outputs the decoded video signals at a timing specified by PTS. In this case, the video signals can be reproduced at the same frame rate as the shooting frame rate.

When the meta-information includes "VFFRatio" element, and also meta-information interpreter 131 instructs decoder 140 based on the reproducing frame rate read from the numerals assigned to "VFRState" to carry out a decoding process, video decoder 140 carries out the following actions: First, meta-information interpreter 131 reads the reproducing frame rate from the numerals assigned to "VFRState", and sets the reproducing frame rate in frame-rate controller 145. Controller 145 then transmits this frame-rate information to video-signal extender 143. Based on the frame rate information, extender 143 requests data passing section 141 to transmit a group of picture (GOP) formed of coded video signals. Meanwhile GOP is a group of plural frames having undergone the inter-frames compression.

Data passing section 141 receives the request, and reads the coded video signals corresponding to the requested GOP from the TS signals stored in data buffer 142, and transmits them to video-signal extender 143. If the TS signals corresponding to the GOP are not stored in data buffer 142, data reading section 110 reads the TS signals from the recording medium, and transmits them to reproducing section 120 for storing in data buffer 142. Data passing section 141 then reads the coded video signals corresponding to the GOP after the TS signals are stored in buffer 142, and transmits the coded video signals to extender 143.

When data passing section 141 transmits the coded video signals corresponding to the GOP to extender 143, the coded video signals are simplified by removing header signals multiplexed to the TS signals, so that the coded video signals become an elementary stream (ES) format which is formed of only coded signals.

Video signal extender 143 then reads video signals stored in frame memory 144 frame by frame at a frame rate set by frame-rate controller 145. At this time, extender 143 reads the video signals following the frame sequence formed when they were shot. Extender 143 thus outputs reproduced video signals at this set frame rate.

After video signals are read from frame memory 144, a vacant space becomes available in memory 144 for storing a new GOP of video signals. Then video-signal extender 143 requests data passing section 141 to transmit a new GOP of video signals. In this embodiment, a series of those actions is repeated for reproducing video signals at the reproducing frame rate specified by "VFRState" of the meta-information.

Based on the information about the shooting frame rate and the information about the reproducing frame rate, reproduction times-speed calculating section 160 calculates at how many times of speed the video is reproduced. For instance, assume that a shooting frame rate is 8 frames/second, and a reproducing frame rate is 24 frames/second, then videos shot in 3 seconds are reproduced in 1 second, so that quick motion of three-times speed is reproduced. Assume that a shooting frame rate is 48 frames/second and a reproducing frame rate is 24 frames/second, then a video shot in 0.5 second is reproduced in 1 second, so that slow motion of a half speed is reproduced.

As discussed above, reproduction times-speed calculating section 160 calculates at how many times of speed a reproduction is carried out through a calculation of dividing the reproducing frame rate by the shooting frame rate, and outputs the result. If the meta-information does not include "VFRRate" element, calculating section 160 determines that the shooting frame rate is equal to the reproducing frame rate, and outputs reproduction information stating that the video signals are reproduced at a single time the speed.

Synthesizer 170 synthesizes the reproduction information, calculated by calculating section 160, about at how many times of speed the reproduction is carried out with the video signals reproduced by video reproducer 140. For instance, the reproduction information shows "a half speed", then the information of "slow motion reproduction at a half speed" is displayed in the reproduced videos. If the reproduction information shows "three times the speed", then the information of "quick motion reproduction at a three times the speed" is displayed in the reproduced videos. Video signals are synthesized such that the foregoing information can be displayed in the reproduced videos.

Synthesizer 170 thus outputs the reproduced video signals with which the information of reproduction times-speed is synthesized. Synthesizer 170 has a switch (not shown) for determining whether or not synthesizing reproduction times-speed information with reproduced video signals, so that it is possible not to show the information in the reproduced video signals.

As discussed above, shooting device 1 and reproducing device 100 in accordance with this exemplary embodiment can shoot moving images at any frame rate set by the user, and reproduce the video signals at any frame rate set by the user, so that slow motion and quick motion can be reproduced.

In the case of reproducing videos, information at how many times of speed the videos are reproduced can be synthesized with the video signals and displayed. On top of that, video signals shot can be compressed by an inter-frame compressing method, an MPEG methods, maintaining the number of frames shot for recording, so that a necessary capacity for recording video signals can be substantially reduced.

In this embodiment, instead of converting video signals into 60p version at the shooting section, the video signals can be transmitted to the recording section at the shooting frame rate as it is. In this case, a general-use monitor TV or a view finder cannot be used, on the other hand, processes such as conversion to 60p version or extraction of effective frames can be eliminated.

In this embodiment, instead of outputting an effective frame flag separately from video signals, the flag can be multiplexed to the video signals, e.g. the flag is multiplexed to a vertical blanking period of the video signals. The frame to be identified by the effective frame flag is not necessarily a leading frame of consecutive and the same frames, but it can be extracted from among the consecutive and the same frames.

In this embodiment, the pickup element is to output video signals at a frame rate arbitrarily set; however, this embodiment is not limited to this structure. For instance, the pickup element keeps outputting video signals at a given frame rate, then the video signals are temporarily stored in a frame memory, and the video signals are read repeatedly such that they have a set frame rate. As a result, the video signals are output substantially at the set frame rate.

In this embodiment, when the shooting frame rate is greater than 60 frames/second, frames shot can be thinned out to be 60 frames/second before they are displayed on an EVF. Not to mention, in such a case, video signals shot are not thinned out, and they are transmitted to the recording section as they are.

In such a case, i.e. when the shooting frame rate is greater than 60 frames/second, all the frames are effective frames, so that effective-frame flags are assigned to all the frames for showing them effective. For instance, a dedicated signal is provided for identifying the flags effective or for identifying all the frames effective regardless of the flags. This dedicated signal thus tells that all the frames are effective.

The directory structure used for recording data into a recording medium is just an example, and this structure does not limit the present invention. In this embodiment, meta-information is described in XML format; however, any format such as a simple text file or a simple binary file can be used as long as they can describe the information corresponding to "VFFRatio" element which specifies a reproducing frame rate.

In this embodiment, when video signals are reproduced at a frame rate specified by "VFRRatio" element, data passing section 141 transfers the data corresponding to GOP in ES format from among TS signals, following a request of transferring the GOP by video-signal extender 143. However, the present invention is not limited to this structure, and the transfer request from extender 143 is not necessarily in a unit of GOP but the request can be any size. Data passing section 141 also can transmit signals to extender 143 by keeping them in MPEG-TS format. At this time, extender 143 neglects the information that controls the timing about the signals multiplexed to TS signals.

In this embodiment, moving images are compressed by an MEPG method, and coded signals are multiplexed by MPEG2-TS method. However, the present invention is not limited to those methods, and moving images can be compressed any inter-frames compressing methods, and coded signals can be multiplexed by MPEG2-PS (program stream) method. Signals can be compressed by a non-compression method or an in-frame compression method instead of the methods discussed above. In this case, advantages similar to what is discussed above can be obtained.

Shooting device 1 in accordance with this embodiment can integrate the shooting section and the recording section in the same device, or have those two sections discretely and couple them with signal cables.

Frame-rate setter 71 in accordance with this embodiment can be separated out from Recording section 50.

In this embodiment, video signals shot at a frame rate arbitrarily set are reproduced at 24 frames/second which has been set as a reproducing frame rate. However, the reproducing frame rate can be fixed at 24 frames/second. In the case of shooting devices for movies, a fixed reproducing frame rate such as 24 frames/second can save time and labor for setting a reproducing frame rate.

A structure having a fixed reproducing frame rate allows meta-information not to include the information about the reproducing frame rate, and finding a coding bit rate through a calculation of dividing the shooting frame rate by the fixed reproducing rate, i.e. 24, and being multiplied by a reference bit rate. In this case, the reproducing device always outputs 24p video signals.

In this embodiment, information such as "reproducing slow motion at a half speed" or "reproducing quick motion at three times the speed" is synthesized with reproduced video signals for displaying; however, this is just one example of display. The display may be "reproduction at a half speed" or "reproduction at three times the speed", in other words, "slow motion" or "quick motion" can be deleted from the display. Displaying only a numeral such as "0.5" or "3" can be used. This reproduction times-speed information can be not only synthesized with video signals and displayed therein, but also the information can be displayed in a column exclusively prepared, or the information can be supplied as signals readable by an external device such as a computer.

In this embodiment, when a shooting frame rate is equal to a reproducing frame rate, the reproduction times-speed information indicates a single time (1) the speed; however, in this case, no information can be displayed, and make it a rule that no display indicates a single time the speed.

In this embodiment, when a shooting frame rate is equal to a reproducing frame rate, those frame rates are not described in meta-information. This is because no description makes it easily understood that those frame rates are equal. If those frame rates are not detected from the recording medium, this preparation allows switching quickly the present process to the decoding process based on the information such as ATS, PTS, DTS which specify an operation timing in decoding.

The present information is not limited to the structure discussed above. For instance, a shooting frame rate and a reproducing frame rate are always described in meta-information, and when those frame rates are equal, the process can be changed to the decoding process which is carried out based on the information such as ATS, PTS, DTS which specify an operation timing in decoding.

INDUSTRIAL APPLICABILITY

The present invention achieves slow-motion reproduction and quick motion reproduction by shooting moving images with a shooting frame rate and a reproducing frame rate set arbitrarily. The present invention also allows displaying at how many times of speed the moving images are reproduced at the reproduction. It also allows recording the video signals shot and compressed with the number of frames maintaining as they are in a recording medium. The present invention is thus useful for moving-image shooting devices, moving image reproducing devices, methods of shooting moving images, and methods of reproducing moving images, those used for shooting movies.

REFERENCE NUMERALS IN THE DRAWINGS

1 Moving-image shooting device
10 Shooting section
20 Video signal obtainer
21 Pickup element
22 Pickup element driver
23 Driving pulse generator
24 Frame memory
25 Video signal preprocessor
30 Microphone
40 Electronic view finder
50 Recording section
60 Signal processor
61 Effective frame extractor
62 Video coding section
63 Audio coding section
64 TS multiplexer
70 Controller
71 Frame-rate setter
80 Data recorder
81 TS signal recorder
82 Meta-information recorder
100 Moving-image reproducing device
110 Data reading section
111 TS signal reader
112 Meta-information reader
120 Reproducing section
130 TS reproducer
131 Meta-information interpreter
140 Video decoder
141 Data passing section
142 Data buffer
143 Video signal extender
144 Frame memory
145 Frame rate controller
160 Reproduction times-speed calculator
170 Synthesizer, Reproduced audio signal

The invention claimed is:

1. A moving-image shooting device for shooting a moving image and recording a resultant video signal in a recording medium; the shooting device comprising:

a frame rate setting section for setting arbitrarily and independently before the shooting, a shooting frame rate, which is a number of frames per unit-time in shooting the moving image, and a reproducing frame rate, which is a number of frames per unit time in reproducing the moving image;

a shooting section for shooting the moving image at the shooting frame rate set by the frame rate setting section; and a recording section for recording information indicating the shooting frame rate and information indicating the reproducing frame rate in the recording medium by a fractional text form in which a denominator is the shooting frame rate and a numerator is the reproducing frame rate, wherein both of the information are linked with the video signal of the moving image shot, and wherein the recording section records both of the information with the video signal linked in the recording medium only when the shooting frame rate is different from the reproducing frame rate; and a video coding section for providing the video signal with a coding process for compressing the moving image by using inter-frame compression, wherein the video coding section determines an amount of video signals coded by the coding process per unit time based on a ratio of the shooting frame rate to the reproducing frame rate.

2. The moving-image shooting device of claim 1, wherein the frame rate setting section divides the shooting frame rate by the reproducing frame rate, and wherein the video coding section determines the amount of video signals coded per unit time at a value based on a result of the division.

3. The moving-image shooting device of claim 2, wherein the video coding section determines the amount of video signals coded per unit time based on a value obtained by multiplying an amount of video signals coded by the coding process per unit time when the shooting frame rate is equal to the reproducing frame rate, by the result of the division.

4. The moving-image shooting device of claim 3, wherein the recording section records the coded video signals, the information about the shooting frame rate and the information about the reproducing frame rate under respective filenames identical to each other except extensions which identify kinds of the files.

5. The moving-image shooting device of claim 4, wherein the reproducing frame rate is set at 24 frames/second by the frame rate setting section.

6. The moving-image shooting device of claim 3, wherein the recording section records an audio signal only when the shooting frame rate is equal to the reproducing frame rate.

7. A moving-image reproducing device for reproducing a moving image by reading a coded video signal from a recording medium in which the moving-image shooting device as defined in claim 1 records the coded video signal, and providing the coded video signal read from the medium with a decoding process, the reproducing device comprising:

a data reading section for reading at least the coded video signal;
a reproducing section for providing the coded video signal with the decoding process before reproducing the video signal; and
a reproduction times-speed calculating section for calculating information about at how many times of speed the coded video signal is reproduced,
wherein the data reading section reads information about the shooting frame rate of the coded video signal and information about the reproducing frame rate of the coded video signal if both of the information are recorded in the medium,
wherein the reproducing section provides the coded video signal with the decoding process based on the information about the reproducing frame rate read from the medium before reproducing the video signal when both of the information are recorded in the medium,
wherein the reproducing section provides the coded video signal with the decoding process such that the coded video signal has a frame rate identical to the shooting frame rate before reproducing the coded video signal when neither of the information is recorded in the medium,
wherein the reproduction times-speed calculating section calculates at how many times of speed the coded video signal is reproduced with a ratio of the information about the shooting frame rate to the information about the reproducing frame rate when both of the information are recorded in the medium, and
wherein the reproduction times-speed calculating section sets a reproducing speed at a single time the speed when neither of the information is recorded in the medium.

8. The moving-image reproducing device of claim 7, wherein the reproducing section decodes the coded video signal at an amount/unit-time equal to an amount of a video signal coded/unit-time by a coding process, wherein the coding process has been carried out when the shooting frame rate is equal to the reproducing frame rate.

9. A method of shooting a moving image comprising the steps of
setting arbitrarily and independently a shooting frame rate, which is a number of frames per unit-time in shooting the moving image, and a reproducing frame rate, which is a number of frames per unit-time in reproducing the moving image;
shooting the moving image at the shooting frame rate;
coding the video signal through inter-frame compression for compressing the moving image;
recording the coded video signal in a recording medium;
determining whether or not the shooting frame rate differs from the reproducing frame rate;
recording information about the shooting frame rate and information about the reproducing frame rate in the recording medium only when the shooting frame rate differs from the reproducing frame rate, wherein both of the information are linked with the video signal;
dividing the shooting frame rate by the reproducing frame rate;
multiplying a result of the division by an amount of the video signal coded/unit-time when the shooting frame rate is equal to the reproducing frame rate at the coding step; and
determining a result of the multiplication as the amount of the video signal coded/unit-time at the coding step.

10. A method of reproducing a coded video signal by reading the coded video signal from a recording medium where the coded video signal is recorded, the method comprising the steps of:
reading the coded video signal from the medium;
detecting whether or not information about the shooting frame rate of the coded video signal and information about the reproducing frame rate of the coded video signal are recorded in the medium;
reading both of the information from the medium when the detecting step detects both of the information are recorded;
reproducing the coded video signal read from the medium based on the information about the reproducing frame rate;
reproducing the coded video signal at a frame rate equal to the shooting frame rate when neither of the information is detected;
calculating a times-speed of reproduction by a ratio of the information about the shooting frame rate to the information about the reproducing frame rate when both of the information are detected; and
determining a reproduction speed as a single time the speed when neither of the information is detected.

\* \* \* \* \*